US009826039B2

(12) United States Patent
Goldstein et al.

(10) Patent No.: US 9,826,039 B2
(45) Date of Patent: Nov. 21, 2017

(54) CONFIGURABLE COMMUNICATION SYSTEMS AND METHODS FOR COMMUNICATION

(71) Applicant: HONEYWELL INTERNATIONAL INC., Morristown, NJ (US)

(72) Inventors: David B. Goldstein, Washington, NJ (US); Wendell Frost, Renton, WA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 132 days.

(21) Appl. No.: 14/172,406

(22) Filed: Feb. 4, 2014

(65) Prior Publication Data
US 2015/0222707 A1 Aug. 6, 2015

(51) Int. Cl.
H04L 29/08 (2006.01)
H04B 1/3822 (2015.01)
H04B 7/26 (2006.01)
H04L 12/725 (2013.01)

(52) U.S. Cl.
CPC .......... H04L 67/12 (2013.01); H04B 1/3822 (2013.01); H04B 7/26 (2013.01); H04L 45/302 (2013.01); H04L 67/322 (2013.01)

(58) Field of Classification Search
CPC ... H04L 67/12; H04L 12/5692; H04L 67/322; H04B 1/3822; H04B 7/16
See application file for complete search history.

(56) References Cited

U.S. PATENT DOCUMENTS

| 4,903,298 | A | * | 2/1990 | Cline | H04K 1/00 380/270 |
|---|---|---|---|---|---|
| 5,351,194 | A | | 9/1994 | Ross et al. | |
| 5,442,553 | A | | 8/1995 | Parrillo | |
| 5,493,309 | A | * | 2/1996 | Bjornholt | G01S 7/003 342/455 |
| 5,530,910 | A | * | 6/1996 | Taketsugu | H04W 36/04 455/444 |
| 5,660,246 | A | | 8/1997 | Kaman | |
| 5,732,074 | A | | 3/1998 | Spaur et al. | |

(Continued)

FOREIGN PATENT DOCUMENTS

EP 1978872 A2 10/2008
EP 2076067 A1 7/2009
(Continued)

OTHER PUBLICATIONS

Merriam-Webster's Collegiate Dictionary, 10th Edition, Merriam-Webster Inc., Springfield, M.A., 1997.*
(Continued)

Primary Examiner — Calvin Cheung
(74) Attorney, Agent, or Firm — Lorenz & Kopf, LLP

(57) ABSTRACT

A method is provided for managing communications from a computing device of a vehicle. The method includes receiving configuration parameters generated by a user; determining a communication priority scheme based on the configuration parameters; communicating a first subset of data according to a first communication medium based on the communication priority scheme; and communicating a second subset of data according to a second communication medium based on the communication priority scheme.

12 Claims, 3 Drawing Sheets

(56) References Cited

U.S. PATENT DOCUMENTS

| | | | |
|---|---|---|---|
| 5,825,332 A * | 10/1998 | Camacho | H01Q 1/286 343/708 |
| 5,940,372 A | 8/1999 | Bertin et al. | |
| 6,016,307 A | 1/2000 | Kaplan et al. | |
| 6,047,165 A | 4/2000 | Wright et al. | |
| 6,104,914 A | 8/2000 | Wright et al. | |
| 6,108,523 A | 8/2000 | Wright et al. | |
| 6,137,783 A * | 10/2000 | Sallberg | H04B 7/18541 370/316 |
| 6,148,179 A | 11/2000 | Wright et al. | |
| 6,154,636 A | 11/2000 | Wright et al. | |
| 6,154,637 A | 11/2000 | Wright et al. | |
| 6,160,998 A | 12/2000 | Wright et al. | |
| 6,163,681 A | 12/2000 | Wright et al. | |
| 6,167,238 A | 12/2000 | Wright | |
| 6,167,239 A | 12/2000 | Wright et al. | |
| 6,173,159 B1 | 1/2001 | Wright et al. | |
| 6,181,990 B1 | 1/2001 | Grabowsky et al. | |
| 6,304,569 B1 | 10/2001 | Rau | |
| 6,308,044 B1 | 10/2001 | Wright et al. | |
| 6,308,045 B1 | 10/2001 | Wright et al. | |
| 6,353,734 B1 | 3/2002 | Wright et al. | |
| 6,385,513 B1 * | 5/2002 | Murray | H04B 7/18508 340/945 |
| 6,438,468 B1 | 8/2002 | Muxlow et al. | |
| 6,456,594 B1 | 9/2002 | Kaplan et al. | |
| 6,473,404 B1 | 10/2002 | Kaplan et al. | |
| 6,477,152 B1 | 11/2002 | Hiett | |
| 6,483,814 B1 * | 11/2002 | Hsu | H04B 7/26 370/277 |
| 6,512,920 B1 * | 1/2003 | Yaoya | H04B 7/18541 455/427 |
| 6,522,867 B1 | 2/2003 | Wright et al. | |
| 6,542,076 B1 | 4/2003 | Joao | |
| 6,542,944 B2 | 4/2003 | D'Errico | |
| 6,587,441 B1 | 7/2003 | Urban et al. | |
| 6,643,571 B2 | 11/2003 | Gotvall et al. | |
| 6,671,589 B2 | 12/2003 | Holst et al. | |
| 6,745,010 B2 | 6/2004 | Wright et al. | |
| 6,760,778 B1 | 7/2004 | Nelson et al. | |
| 6,781,968 B1 * | 8/2004 | Colella | H04B 7/18504 342/354 |
| 6,795,408 B1 | 9/2004 | Hiett | |
| 6,816,728 B2 | 11/2004 | Igloi et al. | |
| 6,876,905 B2 | 4/2005 | Farley et al. | |
| 6,894,611 B2 | 5/2005 | Butz et al. | |
| 6,915,189 B2 | 7/2005 | Igloi et al. | |
| 6,941,204 B2 | 9/2005 | Halm et al. | |
| 6,943,699 B2 | 9/2005 | Ziarno | |
| 6,990,319 B2 | 1/2006 | Wright et al. | |
| 6,993,593 B2 | 1/2006 | Iwata | |
| 7,039,509 B2 | 5/2006 | Podowski | |
| 7,050,894 B2 | 5/2006 | Halm et al. | |
| 7,051,132 B2 | 5/2006 | Hong | |
| 7,072,668 B2 * | 7/2006 | Chou | G01S 5/0027 342/357.4 |
| 7,103,456 B2 | 9/2006 | Bloch et al. | |
| 7,113,852 B2 | 9/2006 | Kapadia et al. | |
| 7,142,528 B2 | 11/2006 | Tanimoto et al. | |
| 7,149,612 B2 | 12/2006 | Stefani et al. | |
| 7,151,985 B2 | 12/2006 | Tripmaker | |
| 7,177,939 B2 | 2/2007 | Nelson et al. | |
| 7,181,478 B1 | 2/2007 | Korson et al. | |
| 7,194,523 B2 | 3/2007 | Nelson et al. | |
| 7,203,630 B2 | 4/2007 | Kolb et al. | |
| 7,221,646 B2 | 5/2007 | Kawano et al. | |
| 7,280,580 B1 * | 10/2007 | Haartsen | H04B 1/7143 375/132 |
| 7,307,956 B2 | 12/2007 | Kaplan et al. | |
| 7,328,012 B2 | 2/2008 | Ziarno et al. | |
| 7,356,389 B2 | 4/2008 | Holst et al. | |
| 7,359,700 B2 | 4/2008 | Swensen et al. | |
| 7,392,018 B1 | 6/2008 | Ebert et al. | |
| RE40,479 E | 9/2008 | Wright et al. | |
| 7,426,387 B2 | 9/2008 | Wright et al. | |
| 7,426,388 B1 | 9/2008 | Wright et al. | |
| 7,428,412 B2 | 9/2008 | Wright et al. | |
| 7,444,146 B1 | 10/2008 | Wright et al. | |
| 7,456,756 B2 | 11/2008 | Ziarno | |
| 7,471,633 B2 | 12/2008 | Yarvis et al. | |
| 7,489,992 B2 | 2/2009 | Valette et al. | |
| 7,595,739 B2 | 9/2009 | Ziarno | |
| 7,603,122 B2 | 10/2009 | Hokao | |
| 7,609,705 B2 | 10/2009 | Wakumoto et al. | |
| 7,630,710 B2 | 12/2009 | Kauffman | |
| 7,636,568 B2 | 12/2009 | Gould et al. | |
| 7,693,093 B2 * | 4/2010 | Riedel | H04W 36/26 370/260 |
| 7,697,460 B2 | 4/2010 | Karacali-Akyamac et al. | |
| 7,703,145 B2 | 4/2010 | Stelling et al. | |
| 7,725,569 B2 | 5/2010 | Brady, Jr. et al. | |
| 7,729,263 B2 | 6/2010 | True et al. | |
| 7,751,815 B2 | 7/2010 | McKenna et al. | |
| 7,755,512 B2 | 7/2010 | Ziarno | |
| 7,756,145 B2 | 7/2010 | Kettering et al. | |
| 7,757,028 B2 * | 7/2010 | Druke | B25J 9/1661 370/235 |
| 7,760,659 B2 | 7/2010 | Luo et al. | |
| 7,782,755 B2 | 8/2010 | Yu | |
| 7,797,445 B2 | 9/2010 | Archer et al. | |
| 7,840,770 B2 | 11/2010 | Larson et al. | |
| 7,852,855 B1 * | 12/2010 | Gooding | H04B 7/18584 370/237 |
| 7,860,101 B2 | 12/2010 | Kekki | |
| 7,870,289 B2 | 1/2011 | Iwata | |
| 7,874,483 B2 | 1/2011 | Wang et al. | |
| 7,894,370 B2 | 2/2011 | Mukraj et al. | |
| 7,908,042 B2 | 3/2011 | Brinkley et al. | |
| 7,920,834 B2 | 4/2011 | Jeong et al. | |
| 7,933,248 B2 | 4/2011 | Hong et al. | |
| 7,937,586 B2 | 5/2011 | Torre et al. | |
| 7,970,410 B2 | 6/2011 | Brinkley et al. | |
| 7,984,190 B2 | 7/2011 | Rhoads | |
| 8,049,656 B2 | 11/2011 | Shani et al. | |
| 8,051,031 B2 | 11/2011 | Sims, III et al. | |
| 8,094,637 B1 * | 1/2012 | Goel | H04W 40/246 370/254 |
| 8,121,140 B2 | 2/2012 | McGuffin et al. | |
| 8,126,147 B2 | 2/2012 | Farley et al. | |
| 8,181,871 B2 | 5/2012 | Wang et al. | |
| 8,255,094 B2 | 8/2012 | Srinivasan et al. | |
| 8,284,674 B2 | 10/2012 | True et al. | |
| 8,290,638 B2 | 10/2012 | Eicke et al. | |
| 8,326,359 B2 | 12/2012 | Kauffman | |
| 8,352,577 B2 | 1/2013 | Martone | |
| 8,423,009 B2 | 4/2013 | Srinivasan et al. | |
| 8,924,716 B2 * | 12/2014 | Miyabayashi | H04L 63/0823 380/255 |
| 9,107,148 B1 * | 8/2015 | Malreddy | H04W 48/20 370/328 |
| 9,565,618 B1 * | 2/2017 | Bantoft | H04W 40/20 |
| 2002/0018008 A1 | 2/2002 | Wright et al. | |
| 2002/0046292 A1 | 4/2002 | Tennison et al. | |
| 2002/0119776 A1 * | 8/2002 | Vestergaard | H04W 60/04 455/436 |
| 2002/0131399 A1 * | 9/2002 | Philonenko | H04L 29/06 370/351 |
| 2003/0003872 A1 | 1/2003 | Brinkley et al. | |
| 2003/0008611 A1 * | 1/2003 | Forman | H04B 7/18508 455/3.01 |
| 2003/0058921 A1 * | 3/2003 | Leeper | H04W 36/0072 375/132 |
| 2003/0069015 A1 | 4/2003 | Brinkley et al. | |
| 2003/0075642 A1 | 4/2003 | Silansky et al. | |
| 2003/0087608 A1 * | 5/2003 | Gustavsson | H04B 1/406 455/83 |
| 2003/0158963 A1 * | 8/2003 | Sturdy | H04L 12/6418 709/238 |
| 2003/0182404 A1 | 9/2003 | Saint-Etienne et al. | |
| 2004/0027255 A1 | 2/2004 | Greenbaum | |
| 2004/0058678 A1 * | 3/2004 | deTorbal | H04W 36/32 455/437 |

(56) References Cited

U.S. PATENT DOCUMENTS

| | | | |
|---|---|---|---|
| 2004/0111739 A1* | 6/2004 | Winegard | H04N 7/148 725/31 |
| 2004/0153884 A1 | 8/2004 | Fields et al. | |
| 2004/0228304 A1* | 11/2004 | Riedel | H04W 36/26 370/332 |
| 2005/0021197 A1 | 1/2005 | Zimmerman et al. | |
| 2005/0026609 A1 | 2/2005 | Brinkley et al. | |
| 2005/0044358 A1* | 2/2005 | Anspach | H04L 29/06027 713/165 |
| 2005/0070222 A1* | 3/2005 | Chapelle | H04B 7/18508 455/12.1 |
| 2005/0100078 A1* | 5/2005 | Nyberg | H04B 1/713 375/133 |
| 2005/0122896 A1* | 6/2005 | Song | H04L 1/0069 370/210 |
| 2005/0153732 A1* | 7/2005 | Stotelmyer | H04W 88/06 455/552.1 |
| 2005/0256616 A1 | 11/2005 | Rhoads | |
| 2006/0052142 A1* | 3/2006 | Herz | H04B 1/406 455/569.2 |
| 2006/0064699 A1 | 3/2006 | Bonk et al. | |
| 2006/0171305 A1* | 8/2006 | Stefani | H04W 72/042 370/228 |
| 2007/0027589 A1 | 2/2007 | Brinkley et al. | |
| 2007/0028089 A1 | 2/2007 | Yukawa et al. | |
| 2007/0242619 A1 | 10/2007 | Murakami et al. | |
| 2007/0244608 A1 | 10/2007 | Rath et al. | |
| 2008/0039076 A1 | 2/2008 | Ziarno et al. | |
| 2008/0074276 A1 | 3/2008 | Valencia et al. | |
| 2008/0119972 A1 | 5/2008 | Peyrucain et al. | |
| 2008/0137636 A1* | 6/2008 | Kasslin | H04W 88/06 370/346 |
| 2008/0174472 A1 | 7/2008 | Stone et al. | |
| 2009/0176475 A1* | 7/2009 | Salkini | G01S 5/02 455/404.1 |
| 2009/0196234 A1* | 8/2009 | Greene | H04L 41/12 370/328 |
| 2010/0027461 A1* | 2/2010 | Bothorel | H04B 7/18506 370/316 |
| 2010/0035607 A1* | 2/2010 | Horr | H04B 7/18508 455/428 |
| 2010/0167723 A1* | 7/2010 | Soumier | H04B 7/18506 455/431 |
| 2010/0211236 A1 | 8/2010 | Ziarno | |
| 2010/0217889 A1 | 8/2010 | Simcoe et al. | |
| 2011/0021195 A1* | 1/2011 | Cormier | H04W 48/18 455/435.2 |
| 2011/0077001 A1* | 3/2011 | Brown | H04W 24/00 455/426.1 |
| 2011/0213888 A1* | 9/2011 | Goldman | H04L 63/1458 709/228 |
| 2011/0255506 A1 | 10/2011 | Toth et al. | |
| 2011/0257834 A1 | 10/2011 | Hebb | |
| 2012/0066751 A1 | 3/2012 | Nutaro et al. | |
| 2012/0130585 A1* | 5/2012 | Declety | G07C 5/085 701/31.7 |
| 2013/0012253 A1* | 1/2013 | Yamamoto | G08G 1/096716 455/509 |
| 2013/0067450 A1 | 3/2013 | Saugnac | |
| 2013/0078995 A1* | 3/2013 | Jouin | G06F 3/1438 455/426.1 |
| 2013/0163523 A1* | 6/2013 | Hughes | H04W 72/10 370/329 |
| 2014/0113557 A1* | 4/2014 | Jain | H04W 48/04 455/41.2 |
| 2014/0136658 A1* | 5/2014 | Wahler | H04B 7/18508 709/218 |
| 2014/0169562 A1* | 6/2014 | Billonneau | H04L 63/0272 380/270 |
| 2014/0215491 A1* | 7/2014 | Addepalli | H04W 4/046 719/313 |
| 2014/0244104 A1* | 8/2014 | Tan | H04B 1/3822 701/36 |
| 2014/0341309 A1* | 11/2014 | Nguyen | H04B 3/54 375/257 |
| 2015/0026312 A1* | 1/2015 | Othmer | H04W 48/18 709/220 |

FOREIGN PATENT DOCUMENTS

| | | | | |
|---|---|---|---|---|
| EP | | 2264980 A1 | 12/2010 | |
| EP | | 2637380 A1 | 9/2013 | |
| WO | WO 2008033534 A2 * | | 3/2008 | H04B 1/034 |

OTHER PUBLICATIONS

EP extended search report for EP 15151993.1-1853 dated May 21, 2015.

Stranden, L. et al. Wireless Communications Vehicle-to-Vehicle and Vehicle-to-Infrastructure, SAFER Vehicle and Traffic Safety Centre Pre-Study No. AD4, Apr. 10, 2008.

Ernst, T. et al. Communications Management in Cooperative Intelligent Transportation Systems; URL: http://raweb.inria.fr/rapportsactivite/RA2011/imara/uid71.html; retrieved from the Internet on Jan. 31, 2014.

Munoz, P. The Littoral Combat Ship Multiple Vehicle Communications System (MVCS); PMS 420 LCS Mission Modules; May 9, 2012; retrieved from the Internet on Jan. 31, 2014—URL: http://www.10thsymposium.com/presentations/Wed%20pm%20A/1600%20Munoz-%20MIW%20Tech%20Symposium%20Brief.pdf.

* cited by examiner

CONFIGURABLE COMMUNICATION SYSTEMS AND METHODS FOR COMMUNICATION

TECHNICAL FIELD

The present disclosure generally relates to methods and systems for communicating between a computing device of a vehicle and ground elements, and more particularly to methods and systems for configuring data communication paths between a computing device of a vehicle and a ground element.

BACKGROUND

Vehicles today (such as aircraft, ground vehicle, surface ships, etc.) include multiple communication paths for transmitting data. Typically, the communication path that is used for a particular transmission is predetermined and unchangeable. At a time when one or more components of the communication path is showing problematic behavior, there is no easy means for changing the communication path.

Hence, there is a need for improved systems and methods for vehicle communications. Other desirable features and characteristics will become apparent from the subsequent detailed description and the appended claims, taken in conjunction with the accompanying drawings and the foregoing technical field and background.

BRIEF SUMMARY

In one embodiment, a method is provided for managing communications from a computing device of a vehicle. The method includes receiving configuration parameters generated by a user; determining a communication priority scheme based on the configuration parameters; communicating a first subset of data according to a first communication medium based on the communication priority scheme; and communicating a second subset of data according to a second communication medium based on the communication priority scheme.

In another embodiment, a communication system for a computing device associated with a vehicle is provided. The communication system includes a non-transitory computer readable medium. The non-transitory computer readable medium includes a first module that receives configuration parameters generated by a user and that determines a communication priority scheme based on the configuration parameters; and a second module that communicates a first subset of data according to a first communication medium based on the communication priority scheme, and that communicates a second subset of data according to a second communication medium based on the communication priority scheme.

In still another embodiment, a computing device of an aircraft is provided. The computing device includes a non-transitory computer readable medium. The non-transitory computer readable medium includes a first module that receives configuration parameters generated by a user and that determines a communication priority scheme based on the configuration parameters; and a second module that communicates a first subset of data according to a first communication medium based on the communication priority scheme, and that communicates a second subset of data according to a second communication medium based on the communication priority scheme.

Furthermore, other desirable features and characteristics of the method and system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following figures, wherein like numerals denote like elements, and wherein.

DETAILED DESCRIPTION

The following detailed description is merely exemplary in nature and is not intended to limit the disclosure or the application and uses of the disclosure. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
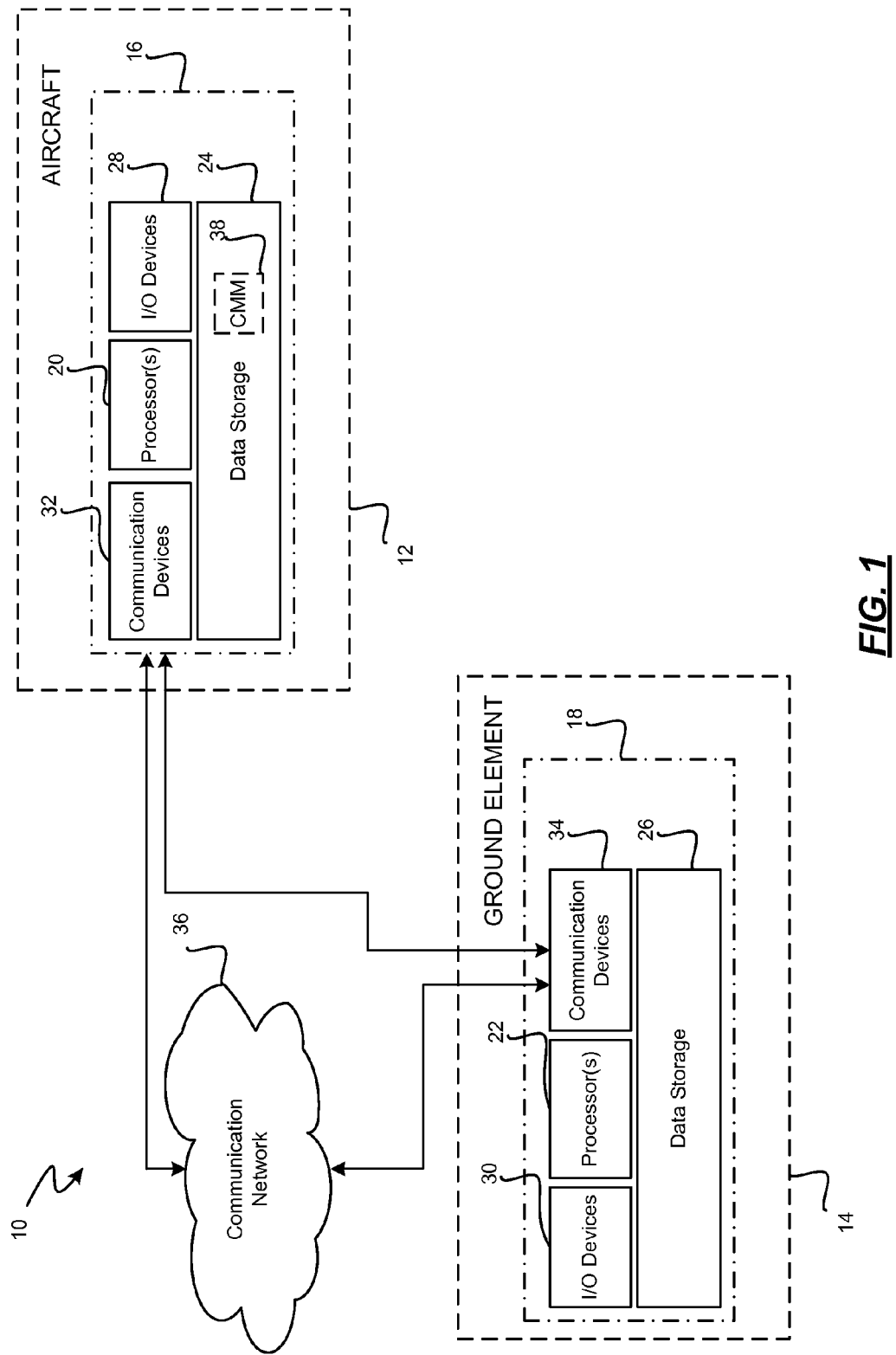
FIG. 1 is a functional block diagram illustrating a communication management system for an aircraft in accordance with exemplary embodiments.

Referring now to FIG. 1, exemplary embodiments of the present disclosure are directed to a communication management system shown generally at 10. In various embodiments, the communication management system 10 manages communications between a vehicle 12 and a fixed element, such as a ground element 14. As can be appreciated, in various other embodiments, the communication management system 10 described herein can be associated with any vehicle 12 that communicates with any fixed element or any other non-fixed element such as another vehicle (not shown). For example, the vehicle 12 or other vehicle (not shown) can be any aircraft, ground vehicle, or sea craft. In another example, the ground element 14 can be any aircraft, ground vehicle, or sea craft related ground element. For exemplary purposes, the disclosure will be discussed in the context of the vehicle 12 being an aircraft 12 that communicates with a ground element 14 that is an aircraft related ground system.

In the example of FIG. 1, the vehicle 12 is an aircraft having a computing device 16 that communicates with the ground element 14. The computing device 16 may be located in a cockpit of the aircraft 12 for interaction by, for example, a pilot or maintenance personnel of the aircraft 12. The computing device 16 may alternatively be located in another area of the aircraft 12 and may be operated by other occupants or individuals associated with the aircraft 12. The ground element 14 is a ground system (such as a maintenance system, or an air traffic control system, or any other aircraft related system) that includes a computing device 18 that communicates with the computing device 16 of the aircraft 12.

Each of the computing devices 16, 18 generally includes one or more processors 20, 22, and one or more data storage devices 24, 26 that communicate with one or more input/output devices 28, 30 and one or more communication devices 32, 34. The communication devices 32, 34 are configured to directly or indirectly communicate with each other using one or more communication methods. For example, the communication devices 32, 34 may communicate directly using a predefined communication protocol (e.g., UHF, VHF, FM, Ethernet, RS-232, RS-422, Mil-STD-1553/1773, etc.) and/or may communicate indirectly through one or more communication networks 36 that communicate via one or more predefined communication protocols (e.g., cellular communication networks, Wi-Fi, etc). The direct communication and the indirect communication will hereinafter be commonly referred to as communication mediums.

In accordance with the present disclosure, the computing device 16 of the aircraft 12 includes a communication manager module 38. The communication manager module 38 is stored in the data storage device 24 and includes instructions that can be executed by the processor 20. The instructions, when executed, cause the communication manager module 38 to manage a communication path for data being transmitted from the computing device 16 to the ground element 14. In various embodiments, the instructions, when executed, cause the communication manager module 38 to configure parameters for managing the communication paths. The parameters may be based on an attributes associated with the various communication methods. The configuration of the parameters can be performed, for example, based on a user interacting with the computing device 16 (e.g., via an interface and the input/output device 28) to create the configuration parameters, or based on a configuration file that stores parameters and that is provided to the computing device 16.

In various embodiments, the instructions, when executed, further cause the communication manager module 38 to modify a current path of communication during transmission of the data based on the parameters and attributes associated with available communication mediums. For example, the communication manager module 38 can identify a current path based on the parameters and attributes of available communication means and can modify the current path during transmission of the data when a communication medium with a desired attribute becomes available.

Figure 2:
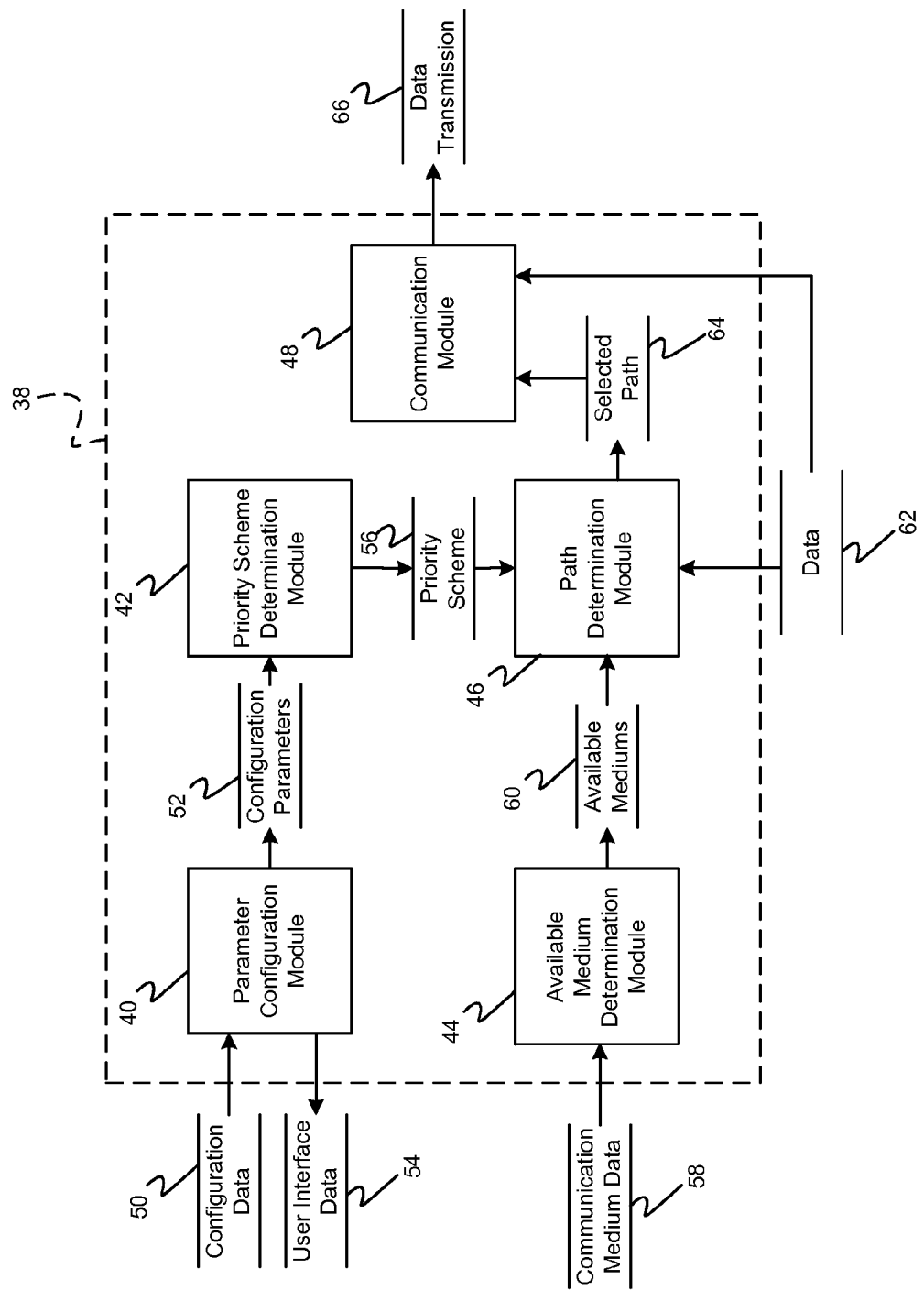
FIG. 2 is dataflow diagram illustrating a communication manager module of the communication management system in accordance with exemplary embodiments.

Referring now to FIG. 2, a dataflow diagram illustrates various embodiments of the communication manager module 38. Various embodiments of communication manager modules 38 according to the present disclosure may include any number of sub-modules embedded within the communication manager module 38. As can be appreciated, the sub-modules shown in FIG. 2 may be combined and/or further partitioned to similarly manage the communication paths between the aircraft 12 (FIG. 1) and the ground elements 14 (FIG. 1). Inputs to the communication manager module 38 may be received from other modules (not shown) of the aircraft 12 (FIG. 1) or computing device 16 (FIG. 1), determined/modeled by other sub-modules (not shown) within the communication manager module 38, and/or may be some other form of user input that is based on a user interacting with the computing device 16 (FIG. 1). In various embodiments, the communication manager module 38 includes a parameter configuration module 40, a priority scheme determination module 42, an available medium determination module 44, a path determination module 46, and a communication module 48.

The parameter configuration module 40 receives as input configuration data 50. The parameter configuration module 40 determines configuration parameters 52 based on the configuration data 50. In various embodiments, the configuration data 50 may be part of a pre-stored configuration file that is configured and stored by a user. In various other embodiments, the configuration data 50 is received based on a user's interaction with a configuration user interface. In such embodiments, the parameter configuration module 40 may generate user interface data 54 that is used to display the configuration user interface for generating the configuration data 50.

The configuration parameters 52 include attributes associated with communication mediums. For example, the attributes can include, but are not limited to speed of transmission, cost to user, reliability of the transmission, or any other factors. The configuration parameters 52 further include one or more rankings of the attributes. The rankings can indicate a priority of the attributes as they pertain to the communication of data. For example, a ranking may prioritize speed of a transmission over reliability of the transmission.

In various embodiments, the configuration parameters may further include conditions. The conditions may be associated with the particular attributes and/or the particular rankings. The conditions can be based on criteria other than the communication mediums such as, but not limited to, criticality of the data to be transmitted, a location of the vehicle, security requirements for the data to be transmitted, etc. By associating conditions with the attributes and/or rankings, multiple rankings for multiple attributes may be provided.

The priority scheme determination module 42 receives as input the configuration parameters 52. The priority scheme determination module 42 determines a priority scheme 56 based on the configuration parameters 52. For example, the priority scheme determination module 42 sets conditions of the priority scheme based on the condition parameters; and the priority scheme determination module 42 associates the rankings of the attributes with the particular conditions.

The available medium determination module 44 receives as input communication medium data 58. The communication medium data 58 includes data that indicates the availability of various communication mediums. The available medium determination module 44 determines available communication mediums 60 based on the communication medium data 58. For example, the available medium determination module 44 evaluates a location or an operating state of the aircraft 12 (FIG. 1) and the communication medium data 58 to determine the available communication mediums 60.

The path determination module 46 receives as input the priority scheme 56, the available mediums 60, and data to be transmitted 62 (or data about the data to be transmitted). The path determination module 46 determines a communication path 64 through one or more of the available communication mediums 60 based on the priority scheme 56. For example, when the priority scheme 56 indicates that the cost attribute is given the highest priority for all standard data, the available communication medium with an associated lowest cost attribute is selected for the path 64. If, however, the data to be transmitted 62 is considered high-criticality data, and the priority scheme 56 indicates that the reliability attribute is given the highest priority for high-criticality data, then the available communication medium with an associated most reliable attribute is selected for the path 64.

The communication module 48 receives as input the communication path 64 and the data to be transmitted 62. The communication module 48 transmits the data 66 or prepares the data for transmission based on the communication path 64. For example, if the communication path 64 indicates a first communication medium, then the communication module 48 transmits the data 66 using a connection and the communication protocol of the first communication medium. If however, during the transmission, the communication path 64 has been updated to another communication medium, then the communication module 48 pauses the transmission on the first communication medium, and resumes the transmission using a connection and a communication protocol of the other communication medium.

Figure 3:
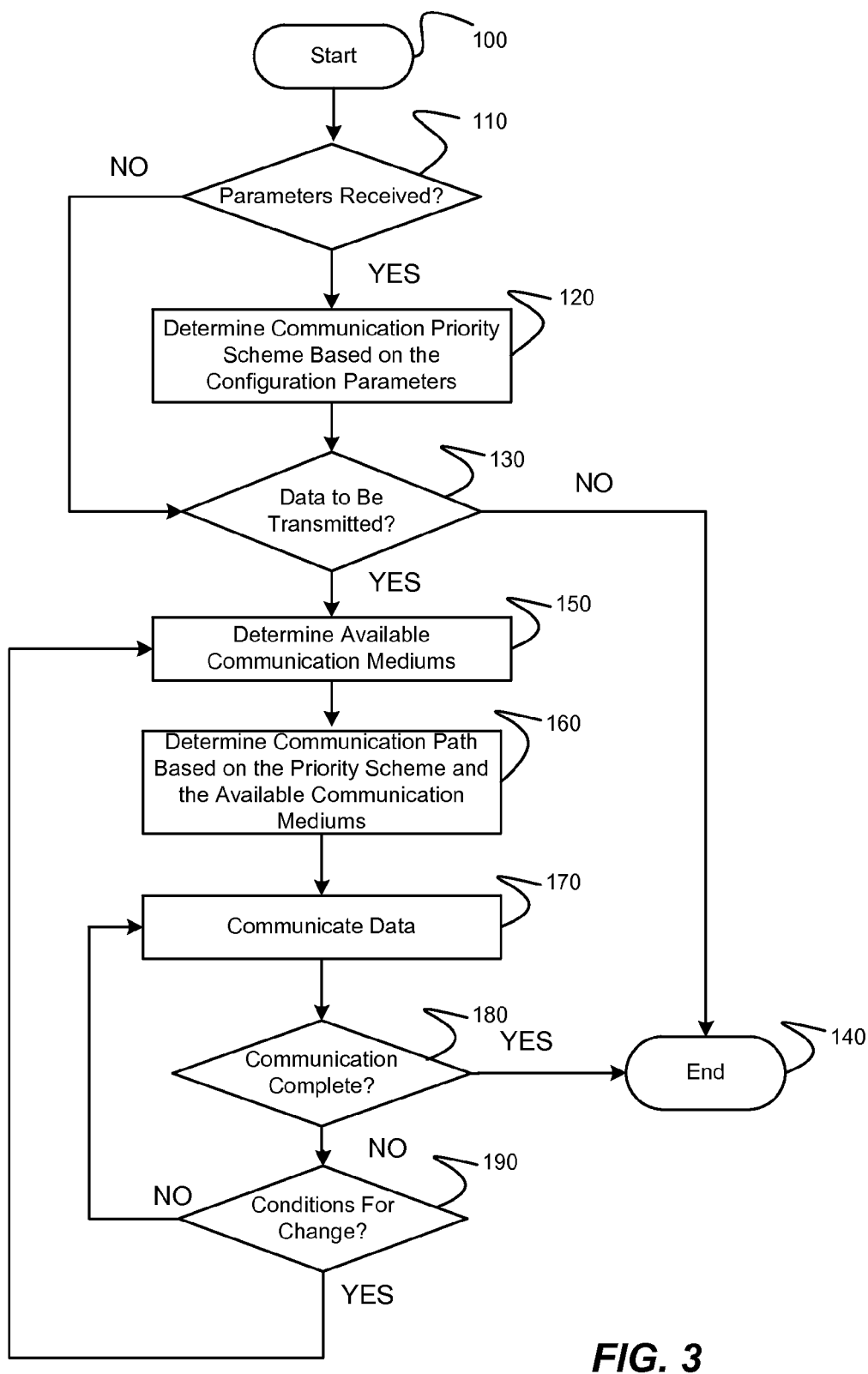
FIG. 3 is a flowchart illustrating a communication management method that may be performed by the communication management module in accordance with exemplary embodiments.

Referring now to FIG. 3, and with continued reference to FIGS. 1 and 2, a flowchart illustrates a communication method that can be performed by the communication manager module 38 of FIG. 2 in accordance with the present disclosure. As can be appreciated in light of the disclosure, the order of operation within the method is not limited to the sequential execution as illustrated in FIG. 3, but may be performed in one or more varying orders as applicable and in accordance with the present disclosure. As can further be appreciated, one or more steps may be added or removed from the method shown in FIG. 3, without altering the spirit of the method.

In various embodiments, the method can be scheduled to run based on predetermined events, and/or can run continually during operation of the aircraft 12.

The method may begin at 100. At 110, it is determined whether new configuration parameters 52 are received (e.g., based on a user interacting with a user interface, based on a configuration file, or based on some other method). If new configuration parameters 52 are not received at 110, the method continues with determining whether data is to be transmitted at 130.

If, however, new configuration parameters 52 are received at 110, the communication priority scheme 56 is determined based on the configuration parameters 52 and is stored for future use at 120. For example, as discussed above, the configuration parameters 52 indicate what attributes of the communication mediums are to be evaluated and indicate a ranking associated with the attributes. In various embodiments, the configuration parameters additionally include conditions that are to be evaluated in addition to or alternative to the ranking.

The method continues at 130 with determining whether data is to be transmitted. If data is not to be transmitted at 130, the method may end at 140. If, however, data is to be transmitted at 130, the available communication mediums 60 are determined at 150 (e.g., based on a current location or other available information). The communication path 64 is then determined based on the priority scheme 56 (either the newly updated priority scheme or a previously stored priority scheme) and the available communication mediums 60. For example, the attributes of the available communication mediums 60 are evaluated and the communication medium with the highest ranked attribute is chosen for the communication medium unless a condition is met which indicates another communication medium should be used.

The data is communicated using the selected communication path 64 at 170. It is evaluated whether the communication of the data is complete at 180. If the communication of the data is not complete at 180, conditions are checked to see if a new communication path can be determined at 190. If conditions have not changed, then the data is communicated at 170 until the communication is complete at 180. Thereafter the method may end at 140.

If, however, conditions have changed, then the available communication mediums 60 are determined at 150, the communication path 64 is determined at 160, and the data is communicated at 170. During transmission at 170, if the communication path 64 has changed, the transmission of the data on the first path is temporarily paused (if it has not already stopped), and the transmission of the data is resumed on the new path. The transmission occurs until it is complete at 180 and the method ends at 140.

Those of skill in the art will appreciate that the various illustrative logical blocks, modules, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of computer readable storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for managing communications from a computing device of a vehicle wherein the computing device is located within the vehicle for managing the communications to ground elements, the computing device comprising:
    receiving, by a parameter module, configuration parameters entered by a user through a user interface, the configuration parameters comprising a plurality of attributes of a communication medium, the attributes comprising cost, speed, reliability, data criticality, and communication path in use wherein the vehicle is an aircraft and the user interface is located within a cockpit of the aircraft or alternatively at other locations within the aircraft;
    determining, by a priority module coupled to the parameter module, a communication priority scheme for a plurality of conditions of the ground elements based on the configuration parameters wherein the plurality attributes of the configuration parameters comprise a ranking accordingly for a particular condition;
    evaluating by a communication determination module the communication priority scheme by one or more attributes of the plurality of attributes related to the priority scheme with available communication mediums for a communication path through one or more of the available communication mediums for transmission of data to the ground elements wherein the one or more attributes at least comprise: priority for a lowest cost or a highest reliability for the transmission of the data;
    communicating, by a communication module based on an evaluation from the communication determination module, to the ground elements a first subset of data for transmission according to a first communication medium with the communication priority scheme associated therewith;
    responding during the transmission of the first subset of data to a change in the communication mediums to the ground elements comprising an update in the communication path from a current communication medium to another communication medium whereby an available communication management module pauses an ongoing transmission on the first communication medium, switches the ongoing transmission to an alternative communication path with the available communication mediums and resumes the ongoing transmissions on the alternative communication path wherein the current communication medium is the first communication medium with the associated communication priority scheme; and
    communicating, subsequently upon a completion of the transmission of the first subset of data, to the ground elements a second subset of data according to a second communication medium based on the communication priority scheme.

2. The method of claim 1, wherein the receiving the configuration parameters is based on a stored configuration file.

3. The method of claim 1, wherein the configuration parameters further comprise a ranking of the attributes of a communication medium.

4. The method of claim 1, wherein the configuration parameters further comprise at least one condition associated with at least one of rankings of the attributes and the attributes.

5. The method of claim 4, wherein the at least one condition is further associated with at least one of security of data to be transmitted, criticality of data to be transmitted, and an operational state of the vehicle.

6. The method of claim 1, wherein the communicating the first subset of data is further based on attributes of the available communication mediums.

7. A communication system for a computing device wherein the computing device is located within a vehicle for managing the communications to ground elements, comprising:
    a non-transitory computer readable medium comprising:
        a parameter module,
            that receives configuration parameters entered by a user through a user interface, the configuration parameters comprising attributes of a communication medium, the attributes comprising cost, speed, reliability, data criticality, and communication path in use wherein the vehicle is an aircraft and the user interface is located within a cockpit of the aircraft or alternatively at other locations within the aircraft;
        a priority module coupled to the parameter module,
            that determines a communication priority scheme based on the configuration parameters for a plurality of conditions of the ground elements;
        a communication determination module
            that evaluates the communication priority scheme with available communication mediums for a communication path through one or more of the available communication mediums for transmission of data to the ground elements;
        a communication module
            that communicates based on an evaluation from the communication determination module, to the ground elements a first subset of data for transmission according to a first communication medium with the communication priority scheme associated therewith, that responds during the transmission of the first subset of data to a change in the communication mediums to the ground elements which comprises an update in the communication path from a current communication medium to another communication medium whereby an available communication management module pauses an ongoing transmission on the first communication medium, switches the ongoing transmission to an alternative communication path with the available communication mediums and resumes the ongoing transmissions on the alternative communication path wherein the current communication medium is the first communication medium with the associated communication priority scheme; and that communicates, subsequently upon a completion of the transmission of the first subset of data, to the ground elements a second subset of data according to a second communication medium based on the communication priority scheme.

8. The communication system of claim 7, wherein the parameter module receives the configuration parameters based on a stored configuration file.

9. The communication system of claim 7, wherein the configuration parameters comprise a ranking of the attributes of a communication medium.

10. The communication system of claim 7, wherein the configuration parameters comprise at least one condition associated with at least one of the rankings of attributes and the attributes.

11. The communication system of claim 10, wherein the at least one condition is associated with at least one of security of data to be transmitted, criticality of data to be transmitted, and an operational state of an aircraft.

12. A computing device of an aircraft, comprising:
a non-transitory computer readable medium wherein the computing device is located within the aircraft for managing the communications to ground elements, comprising:
a parameter module,
that receives configuration parameters entered by a user through a user interface, the configuration parameters comprising attributes of a communication medium, the attributes comprising cost, speed, reliability, data criticality, and communication path in use wherein the user interface is located within a cockpit of the aircraft or alternatively at other locations within the aircraft;
a priority module coupled to the parameter module,
that determines a communication priority scheme based on the configuration parameters for a plurality of conditions of the ground elements;
a communication determination module
that evaluates the communication priority scheme with available communication mediums for a communication path through one or more of the available communication mediums for transmission of data to the ground elements;
a communication module
that communicates based on an evaluation from the communication determination module, to the ground elements a first subset of data for transmission according to a first communication medium with the communication priority scheme associated therewith; and
that communicates a second subset of data according to a second communication medium based on the communication priority scheme to the ground elements.

* * * * *